Figure 1:
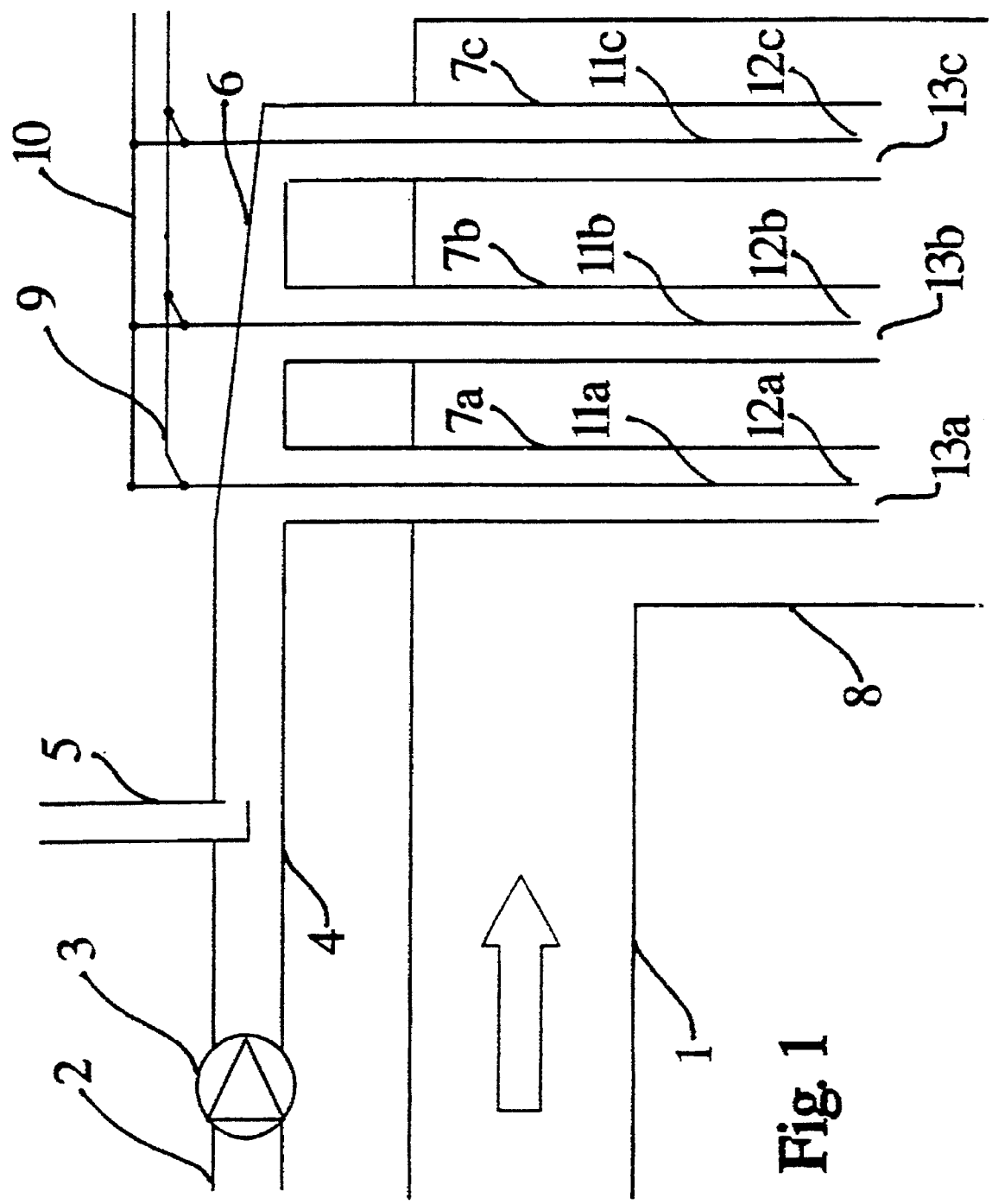
Figure 2:
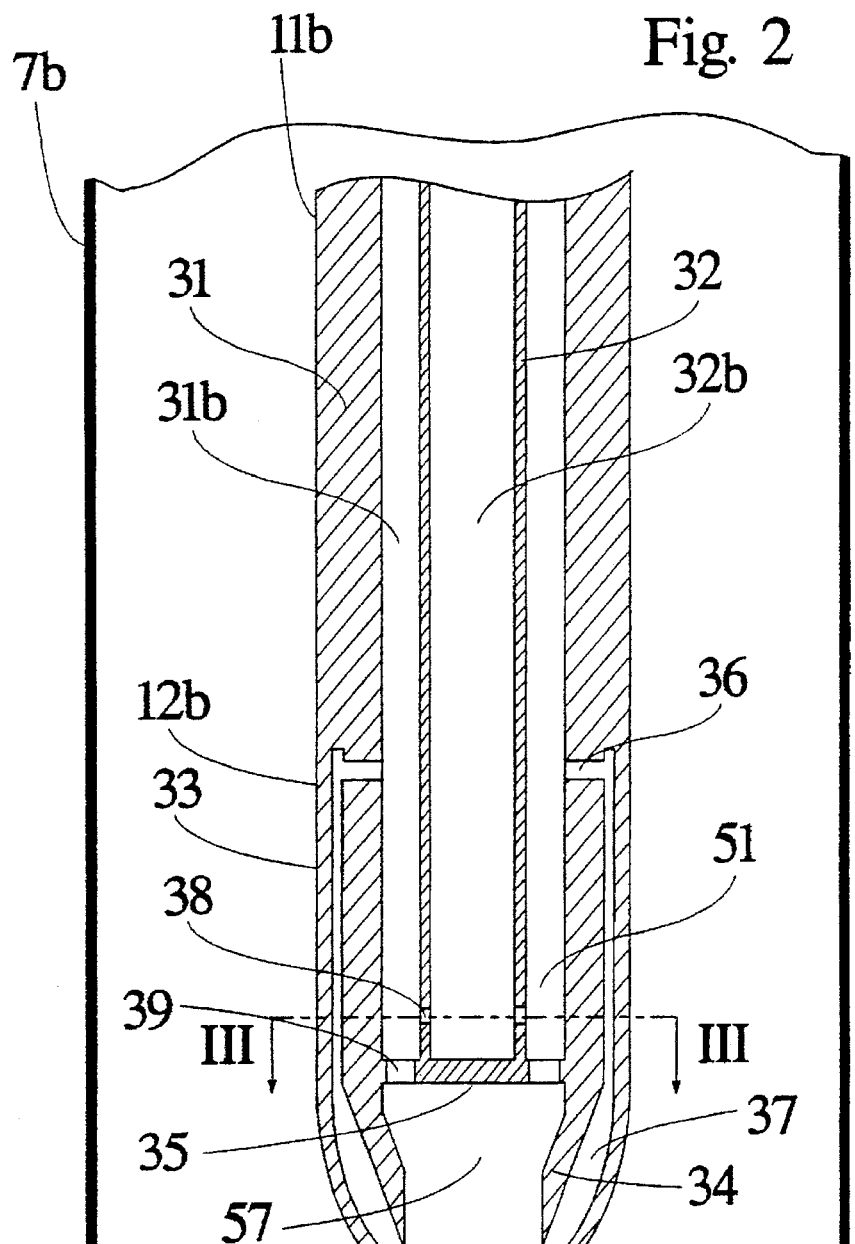
Figure 3:
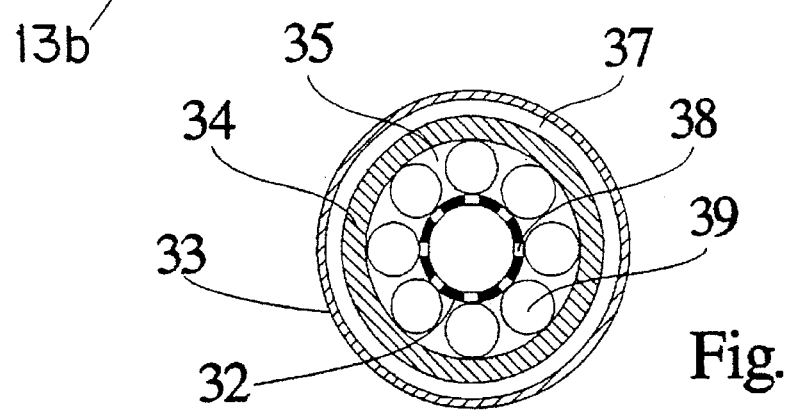

United States Patent [19]

Bringfors

[11] Patent Number: 5,641,124
[45] Date of Patent: Jun. 24, 1997

[54] APPARATUS FOR CLEANING GAS

[75] Inventor: Nils Bringfors, Frövägen, Sweden

[73] Assignee: ABB Flakt AB, Stockholm, Sweden

[21] Appl. No.: 411,835

[22] PCT Filed: Oct. 6, 1993

[86] PCT No.: PCT/SE93/00810

§ 371 Date: Mar. 30, 1995

§ 102(e) Date: Mar. 30, 1995

[87] PCT Pub. No.: WO94/08700

PCT Pub. Date: Apr. 28, 1994

[30] Foreign Application Priority Data

Oct. 8, 1992 [SE] Sweden ............... 9202962

[51] Int. Cl.[6] .................. B05B 1/28; B05B 7/06
[52] U.S. Cl. ................... 239/290; 239/431
[58] Field of Search .................. 239/424, 424.5, 239/431, 434.5, 290

[56] References Cited

U.S. PATENT DOCUMENTS

| | | | |
|---|---|---|---|
| 1,565,996 | 12/1925 | French | 239/431 X |
| 2,566,040 | 8/1951 | Simmons | 239/431 X |
| 2,613,737 | 10/1952 | Schwietert | 239/431 X |
| 3,790,086 | 2/1974 | Masai | 239/434.5 X |
| 4,625,916 | 12/1986 | Nieuwkamp et al. | 239/431 |

FOREIGN PATENT DOCUMENTS

| | | |
|---|---|---|
| 0 079 081 | 5/1983 | European Pat. Off. . |
| 0 177 896 | 4/1986 | European Pat. Off. . |
| 0 185 630 | 10/1988 | European Pat. Off. . |
| 0 211458 | 12/1993 | European Pat. Off. . |
| 2627880 | 12/1977 | Germany . |
| 32 35 341 | 3/1984 | Germany . |
| 36 07 357 | 5/1987 | Germany . |
| 7908674 | 8/1983 | Sweden . |
| 8005571 | 5/1985 | Sweden . |
| 7904382 | 3/1987 | Sweden . |
| 8500612 | 2/1988 | Sweden . |
| 8504675 | 2/1988 | Sweden . |
| 8505269 | 4/1990 | Sweden . |
| 465 502 | 9/1991 | Sweden . |
| WO91/12084 | 8/1991 | WIPO . |

*Primary Examiner*—Lesley D. Morris
*Attorney, Agent, or Firm*—Burns, Doane, Swecker & Mathis, L.L.P.

[57] ABSTRACT

A nozzle (12a, 12b, 12c) for atomizing a liquid, optionally containing suspended dry matter, through use of compressed gas, comprises, an inlet (32b) for liquid, an inlet (31b) for compressed gas, and an outlet (41) for gas mixed with finely divided liquid, as well as an intermediate mixing space (51). The inlet (31b) for compressed gas is adapted to give the gas a substantially rectilinear path through the mixing space (51). The inlet (32b) for the liquid is separated from the mixing space (51) by a partition (32) having a plurality of first holes (38) for introducing the liquid into the mixing space (51) in a direction substantially perpendicular to the main flow direction of the gas in the mixing space (51). The mixing space (51) is defined downstream by a wall (35) having a plurality of second holes (39). An inlet device (11a, 11b, 11c) comprising the inlet (31b) for compressed gas and the inlet (32b) for liquid consists of two concentric tubes (31, 32). The inlet (32b) for liquid consists of the inner tube (32). The inlet (31b) for compressed gas consists of the annular conduit (31b) between the concentric tubes (31, 32). The inner tube (32) is closed in the axial direction downstream of the first holes (38) provided for introducing the liquid into the mixing space (51). A convergent channel (57) connects the mixing space (51) to the outlet (41).

16 Claims, 2 Drawing Sheets

APPARATUS FOR CLEANING GAS

TECHNICAL FIELD

The present invention relates to an apparatus for cleaning gas in order, from a flow of polluted gas, to remove gaseous pollutants.

The apparatus comprises a nozzle for atomizing a liquid, optionally containing suspended dry matter, by means of compressed gas, comprising, an inlet for liquid, an inlet for compressed gas, and an outlet for gas mixed with finely divided liquid, as well as an intermediate mixing space. The inlet for compressed gas is adapted to give the gas a substantially rectilinear path through the mixing space. The inlet for the liquid is separated from the mixing space by a partition having a plurality of first holes for introducing the liquid into the mixing space in a direction substantially perpendicular to the main flow direction of the gas in the mixing space. The mixing space is defined downstream by a wall having a plurality of second holes.

The apparatus is especially suited for separating sulphur dioxide from flue gases. In such separation, use is generally made of completely wet methods or methods where a large amount of absorbent is suspended in water and supplied in finely divided form to the flue gas, because completely dry methods do not yield satisfactory separation of sulphur dioxide on account of the relatively low reactivity thereof, with inexpensive absorbents such as slaked lime or finely milled limestone.

BACKGROUND OF THE INVENTION

The emission of acidifying gases, such as sulphur dioxide, from e.g. coal-fired power plants has become a major environmental problem. Several different methods have been tried in order to reduce emissions of this type.

To this end, it has been suggested both to purify the fuel and to take measures during the combustion and/or to clean the flue gas produced. Certain pollutants, such as nitrogen oxides, can be dissolved in harmless substances. The formation of pollutants can also be counteracted or obviated by optimizing the combustion process. Other substances, such as sulphur, can however be taken care of only as a residual product and must not be emitted in any form in an uncontrolled manner. In order to remove sulphur, for example, an absorbent is generally added which contains substances forming together with sulphur stable compounds, either in the combustion chamber or in a specially designed flue gas cleaning system.

Examples of prior-art methods are given in SE-8005571-8 involving the injection of absorbent into the combustion chamber, DE-36 07 357 involving wet flue gas cleaning, SE-7904382-4 involving wet-dry flue gas cleaning, EP-0 177 896 involving completely dry flue gas cleaning, and SE-8505269-4 disclosing a combinatory solution.

When supplying absorbent in the combustion chamber, the major drawback is the low degree of utilization of the absorbent. The wet flue gas scrubbers are far more efficient in this respect, but involve high investment costs and maintenance problems.

Wet-dry flue gas cleaning entails lower investment costs but requires a more refined and thus more expensive absorbent than the wet flue gas scrubbers. To avoid precipitation of moisture in the flue gas cleaning system, the absorbent is supplied, in the wet-dry methods, dissolved or suspended in an amount of water which is smaller than the amount required for cooling the flue gas to a temperature below the saturation temperature. The amount of liquid supplied and, hence, the amount of absorbent supplied are thus limited by the heat content of the flue gas.

The completely dry methods involve the lowest investment costs for the flue gas cleaning systems, but most often require a highly refined and, thus, expensive absorbent and do not permit high-grade cleaning. The main reason for this is that solid phase reactions are slow at the temperatures normally prevailing after a coal-fired boiler.

To obtain high-grade cleaning by means of a simple flue gas cleaning system which does not include means for producing, transporting or atomizing an absorbent suspended in water, different techniques intermediate between the dry and wet-dry methods have been suggested.

SE-7908674-0, for example, suggests separate moistening of the flue gases before introduction into a bag filter, the bags of which have been coated with a dust cake of calcium hydroxide. SE-8504675-3 instead suggests moistening of the absorbent with water before it is supplied to the flue gas. The amount of water then must not be larger than as to permit maintaining the powder form of the absorbent.

None of these techniques however yields sufficiently effective flue gas cleaning according to current environmental standards. Therefore, many combinatory solutions have been suggested, according to which a completely dry absorbent as well as an absorbent suspended in water are added. Examples hereof are given in DE-32 35 341 where a dry absorbent is added upstream of an absorbent in slurry form, in SE-8500612-0 where the fresh absorbent is added in dry form while the recycled one is added in the form of a slurry, and in EP-211 458 where an absorbent in dry form and an absorbent in slurry form are added separately or together in the same contact reactor depending on operational conditions.

To supply the absorbent, different types of nozzles have been developed in compliance with the conditions in which they are to operate. Examples of nozzles for supplying and atomizing a slurry having a high dry solids content are given in EP-079 081 and EP-185 630. Examples of nozzles for supplying a completely dry pulverulent absorbent are given in SE-8500612-0. Examples of nozzles for supplying water alone or suspensions having a low dry solids content are given in DE-26 27 880, U.S. Pat. No. 4,625,916 and WO-A-9112084.

DE-26 27 880 describes a nozzle substantially made of two concentric tubes or one tube with a surrounding chamber. Liquid is pumped in the inner tube, and compressed air is supplied to the outer tube or the chamber. The partition is formed with a plurality of holes, through which compressed air flows into the inner tube and mixes with the liquid. The mixture leaves the tube with a step form pressure drop producing an effective disintegration of the liquid which requires little energy.

U.S. Pat. No. 4,625,916 describes a nozzle similar to that just mentioned but which terminates in a divergent channel and, thus, probably does not give rise to any step form pressure drop at the outlet. Furthermore, the partition has holes arranged in a specific pattern in order to make the mixing of air and liquid efficient.

WO-A-9112084 reveals a nozzle for atomizing a liquid to be injected into a process gas, e.g. in the separation of arsenic from a gas containing the same. The nozzle comprises a central mixing space through which the atomizing gas is flowing substantially rectilinearly and into which the liquid is supplied inwards through essentially radially bored holes. Pressurized air and liquid is supplied to the nozzle in two separate parallel tubes. The nozzle comprises several pieces which are threaded together and the leakage, between the inlets and to the surroundings is prevented by gaskets.

These nozzles have been found to be liable to leakage, the liquid escaping into the air duct in places where not desired, and to pressure adjustment difficulties, where inequilibrium means that liquid escapes through the holes which are intended for the intake of air. If the liquid contains dry matter, such malfunctions soon result in deposits of material in the air duct system and time-consuming cleaning operations to restore proper function.

OUTLINE OF THE INVENTION

Technical Problem

As will have been appreciated from the above, the separation of gaseous pollutants from a process gas, e.g. flue gas, is a technical problem. It is especially difficult to achieve effective separation of less reactive pollutants, such as sulphur dioxide, by methods where the absorbent, completely or to a large extent, is supplied in dry form.

It is thus a major technical problem to provide a method which does not require handling substantial amounts of slurry or suspensions, which lessens the resistance to wear and impairs functional reliability, but yet permits attaining substantially all the advantages of supplying the absorbent in a slurry with a high degree of utilization of the absorbent, while supplying the main part of the absorbent in dry form.

It further is a major technical problem to provide an apparatus for atomizing a suspension which is so designed that the operation is affected but to a minor extent by leakage between the channels for the compressed gas, to atomize the liquid suspension, and for the liquid suspension and by leakage from the channel for the liquid suspension to the surrounding polluted gas.

OBJECTS OF THE INVENTION

One object of the present invention is to provide a simple apparatus for separating less reactive pollutants, such as sulphur dioxide, which can be used without major investments for new constructions, and which can be easily applied also when reconstructing existing flue gas cleaning systems.

Another object of the invention is to provide a simple apparatus for effectively moistening dust that is recycled in a gas absorption plant, and yet ensure high operational reliability and low energy consumption.

Yet another object of the invention is to provide a nozzle, which is able to atomize a liquid or a liquid suspension, without suffering from any leakage problems although it can be used substantially without any rubber gaskets or the like, whereby to considerably facilitate handling, dismounting and maintenance.

SUMMARY OF THE INVENTION

The present invention relates to an apparatus for cleaning gas in order, from a flow of polluted gas, to remove gaseous pollutants.

The apparatus comprises a nozzle for atomizing a liquid, optionally containing suspended dry matter, by means of compressed gas, comprising, an inlet for liquid, an inlet for compressed gas, and an outlet for gas mixed with finely divided liquid, as well as an intermediate mixing space.

The inlet for compressed gas is adapted to give the gas a substantially rectilinear path through the mixing space. The inlet for the liquid is separated from the mixing space by a partition having a plurality of first holes for introducing the liquid into the mixing space in a direction substantially perpendicular to the main flow direction of the gas in the mixing space. The mixing space is defined downstream by a wall having a plurality of second holes.

An inlet device comprising the inlet for compressed gas and the inlet for liquid consists of two concentric tubes. The inlet for liquid consists of the inner tube. The inlet for compressed gas consists of the annular conduit between the concentric tubes.

The inner tube is closed in the axial direction downstream of the first holes provided for introducing the liquid into the mixing space.

A convergent channel connects the mixing space to the outlet.

GENERAL DESCRIPTION OF THE INVENTION

The invention relates to an apparatus adapted for use in a method for separating gaseous pollutants from a process gas, e.g. flue gas. In this method cleaning is effected by supplying an absorbent into the gas flow in the form of dry particles and/or in the form of a liquid suspension. The amount of liquid is so adjusted that the liquid is completely evaporated when contacting the gas. The thus-obtained dry dust containing unreacted absorbent and formed reaction products, is separated in a downstream dust separator and is recycled, at least partly, for re-use.

In this method, a carrier gas flow, such as air, is supplied with the recycled dust and optionally a fraction of fresh absorbent. The ratio of the carrier gas flow to the total flow of dry matter in the carrier gas flow may be 0.1–10 kg/standard cubic meter.

To this flow of heavily dust-laden carrier gas is thereafter added an atomized suspension of fresh absorbent. The suspension has a relatively low dry solids content, at the most 15%, preferably less than 10%. The purpose of this dry matter is to facilitate the transfer of moisture to the recycled dust which is entrained by the carrier gas flow concerned. In fact, it has surprisingly been found that an essentially more uniform distribution of the moisture is achieved in this manner, which is of decisive importance to the separation efficiency. It has also been found advantageous to use fresh absorbent in the suspension, since it is essentially more reactive than the recycled dust, this difference being of great avail, in that only fresh absorbent is supplied in suspension.

The atomization of the suspension is, according to this invention, carried out in an internal mixing nozzle with the aid of compressed gas, preferably air.

It has been found that it is possible to avoid many of the problems linked with the formation of deposits when atomizing suspensions, by ensuring that the compressed gas has such a temperature and humidity that no essential evaporation of the finely divided liquid occurs during the atomization process and during the contact between the compressed gas and the finely divided droplets. With such adaptation, an apparently reverse construction can operate quite excellently and, hence, it is possible to reduce leakage problems quite considerably and, consequently, manage with substantially longer intervals between shutdowns for maintenance.

To attain the object of the invention, there is provided an apparatus for atomizing the suspension which comprises two concentric conduits in which liquid suspension and compressed gas are brought together. As opposed to established practice in atomizing low-viscous suspensions, it is suggested that the suspension is allowed to flow into the conduit in which the gas is flowing and be conveyed out of the nozzle together by the gas. Because the gas is cold and preferably moist, there is no deposit of dry matter in the gas conduit, since no drying takes place. Any matter, which all the same may adhere to the walls, is still conveyed away by the flowing gas. Another advantage is that any leakage that may occur between the conduits is of no consequence. If joints between parts of the nozzle and the supply ducts should leak, it is possible, by the positioning of the conduit for the supply of the suspension inside the air conduit, to prevent the suspension from spurting out as a jet into the carrier gas laden with dry recycled dust, or into the polluted gas, where it dries and deposits on ducts or other construction details. It will now only emerge into the conduit for the compressed gas and be conveyed away thereby.

The mixing space, being a direct extension of the gas conduit, terminates in a washer without any special sealing against the nozzle walls, whereby to obtain a construction which is easy to manufacture and dismount.

BRIEF DESCRIPTION OF THE DRAWINGS

The invention will now be described in more detail with reference to the accompanying drawings, in which FIG. 1 schematically shows an apparatus for carrying out a method of gas cleaning using the nozzle according to the invention;

FIG. 2 is a vertical section of a nozzle according to the present invention; and FIG. 3 is a cross-section of the nozzle in FIG. 2.

DESCRIPTION OF THE PREFERRED EMBODIMENT

FIG. 1 schematically shows an apparatus, for carrying out a gas cleaning method, using the nozzles according to the invention, having a duct 1 for a flow of polluted gas, from an incineration plant (not shown). The gas is conducted through the duct 1 into a reactor 8. A carrier gas flow is drawn in through a duct 2, and is pumped by a fan 3 through a duct 4 where it is supplied, via the inlet means 5, with dust which is recycled from a dust separator (not shown) located downstream of the reactor 8.

The dust-laden carrier gas flow is conducted through the duct 4 to a distributor 6 where it is divided into a plurality of partial flows which, via a plurality of large tubes 7*a*, 7*b*, 7*c* of a diameter of 100 mm, are conducted into the reactor 8 and mixed with the flue gas. The dust-laden mixture of flue gas and carrier gas is passed from the reactor 8 on to the dust separator (not shown) in which the dust is separated, and the main part of it is recycled to the flue gas via the inlet means 5 in the duct 4.

Within the large tubes 7*a*, 7*b*, 7*c*, there are provided double-shelled tubes 11*a*, 11*b*, 11*c* having an outer diameter of 40 mm (drawn in plain lines for greater clarity), to which are supplied a diluted lime suspension, via a conduit 9, and compressed air, via a conduit 10. The lime suspension is atomized in nozzles 12*a*, 12*b*, 12*c* arranged in the lower ends of the double-shelled tubes 11*a* etc., and is injected into the carrier gas partial flows mixed with recycled dust. As described below, the nozzles 12*a* etc. are arranged in the vicinity of the outlets 13*a*, 13*b*, 13*c* of the large tubes 7*a* etc., preferably immediately upstream of the respective outlets.

FIG. 2 is a vertical section illustrating in more detail the outlet 13*b* of the large tube 7*b* and the associated nozzle 12*b*. The double-shelled tube 11*b* consists of an outer thick wall 31 and a concentric inner, thinner wall 32 enclosing a cylindrical conduit 32*b* having a diameter of 10 mm. Between these walls is defined an annular conduit 31*b* having an inner diameter of 12 mm and an outer diameter of 30 mm. The conduits 31*b* and 32*b* both terminate at a transverse wall in the form of a nozzle washer 35 having eight circular holes 39 of a diameter of 6 mm located in the annular conduit 31*b*, but completely closed opposite the duct 32*b*. Through the thin wall 32, between the conduit 32*b* and the annular conduit 31*b*, extend radial holes 38 of a diameter of 3 mm which are located just in front of the holes 39 in the nozzle washer 35.

The outer wall 31 changes at the nozzle 12*b* into a thinner shell 33 surrounding an annular cavity 37, in turn surrounding the outer wall 34 of the nozzle 12*b*. Via radial holes 36, the annular conduit 31*b* communicates with the annular cavity 37. The nozzle 12*b* terminates in a convergent channel 57 and a circular opening 41 of a diameter of 11 mm downstream of the circular holes 39 in the nozzle washer 35. The annular cavity 37 opens in an annular opening 40 having an outer diameter of 20 mm, between the outer wall 34 of the nozzle and the thinner shell 33.

To facilitate manufacture and maintenance, the nozzle 12*b* consists of several easily detachable parts which are screwed together or inserted in each other. Thus, for example, the nozzle washer 35 with a portion of the tube 32 is loosely inserted in the outer wall 34 of the nozzle which in turn is threadedly connected to the thick wall 31. For reasons of clarity, this is not shown in the Figure.

FIG. 3 is a section of the nozzle 12*b* taken along the line III—III in FIG. 2. The reference numerals agree with those in FIG. 2.

The nozzle operates as follows. Reference is being made to FIG. 1 and FIG. 2.

Cold and optionally moistened compressed air is pumped through the annular conduit 31*b* from means (not shown) to the nozzle 12*b* and out through the circular holes 39 in the nozzle washer 35 and thence out through the circular opening 41 to be mixed with the dust-laden carrier gas which is blown through the tube 7*b* by the fan 3.

Through the cylindrical conduit 32*b* is pumped, by means (not shown), a lime suspension having a dry solids content of about 5–10%. This suspension is pressed out through the radial holes 38 in the wall 32 into the surrounding annular mixing space 51 in the extension of the conduit 31*b*, where it is atomized by the flowing compressed air and conveyed through the circular holes 39 in the nozzle washer 35 so as to be further atomized, and on through the convergent channel 57 and the opening 41 of the nozzle 12*b* out into the surrounding carrier gas mixed with recycled dust.

The annular cavity 37 is supplied with compressed air via the radial holes 36 in the thick wall 31. This compressed air flows from this annular cavity out through the annular opening 40 between the wall 34 of the nozzle and the surrounding thin shell surface 33. This emerging air is not mixed with lime-containing water droplets and acts as a screen serving to prevent wet lime, because of the generation of eddies, from being deposited on the nozzle surface with ensuing soiling problems and impaired function, necessitating short cleaning intervals.

The radial or first holes 38 are preferably arranged in a plane perpendicular to the liquid inlet or conduit 32*b*, extend substantially radially and are located in the immediate vicinity of the wall 35 which defines the mixing space 51 downstream, and are preferably substantially uniformly distributed around the circumference of the liquid inlet or conduit 32b. The circular or second holes 39 in the wall 35 defining the mixing space 51 downstream are preferably arranged equiangularly with respect to the first holes 38 introducing the liquid into the mixing space 51. The diameter of the liquid inlet or conduit 32b is preferably 5–20 mm, the diameter of the outer conduit or gas inlet 31b is preferably 20–60 mm, the diameter of the outlet or opening 41 is preferably 5–20 mm, the diameter of the first holes 38 is preferably 2–6 mm, and the diameter of the second holes 39 is preferably 5–10 mm.

I claim:

1. A nozzle for atomizing a liquid through use of compressed gas, the nozzle comprising:

an inlet for liquid, the inlet for liquid being defined by an inner tube;

an inlet for compressed gas, the inlet for compressed gas being an annular conduit defined by an outer tube and the inner tube, the inner tube and the outer tube being concentric;

an outlet for gas mixed with finely divided liquid; and an intermediate mixing space;

the inlet for the compressed gas defining a substantially rectilinear path for the compressed gas through the mixing space;

the inlet for the liquid being separated from the mixing space by a partition having a plurality of first holes through which the liquid is introduced into the mixing space in a direction substantially perpendicular to a main flow direction of the compressed gas in the mixing space;

the mixing space including a wall at a downstream portion of the mixing space, the wall having a plurality of second holes the inner tube being closed in an axial direction downstream of the first holes; and a convergent channel connecting the mixing space to the outlet;

the outer tube including an annular space, the annular space communicating with the inlet for compressed gas, through third holes in the outer tube, and an annular gap at the outlet of the nozzle such that a gas curtain is produced around a mixture of gas and atomized liquid leaving through the outlet of the nozzle.

2. A nozzle as claimed in claim 1, wherein the mixing space is defined by an extension of the annular conduit.

3. A nozzle as claimed in claim 2, wherein the first holes are arranged in a plane perpendicular to the inner tube, extend substantially radially and are located proximate the wall.

4. A nozzle as claimed in claim 3, wherein the second holes.

5. A nozzle as claimed in claim 4, wherein a diameter of the inner tube is 5–20 mm, a diameter of the outer tube is 20–60 mm, a diameter of the outlet is 5–20 mm, a diameter of the first holes is 2–6 mm, and a diameter of the second holes is 5–10 mm.

6. A nozzle as claimed in claim 2, wherein a diameter of the inner tube is 5–20 mm, a diameter of the outer tube is 20–60 mm, a diameter of the outlet is 5–20 mm, a diameter of the first holes is 2–6 mm, and a diameter of the second holes is 5–10 mm.

7. A nozzle as claimed in claim 3, wherein a diameter of the inner tube is 5–20 mm, a diameter of the outer tube is 20–60 mm, a diameter of the outlet is 5–20 mm, a diameter of the first holes is 2–6 mm, and a diameter of the second holes is 5–10 mm.

8. A nozzle as claimed in claim 1, wherein the first holes are arranged in a plane perpendicular to the inner tube, extend substantially radially and are located proximate the wall.

9. A nozzle as claimed in claim 8, wherein the first holes are substantially uniformly distributed around a circumference of the inner tube.

10. A nozzle as claimed in claim 9, wherein the second holes are arranged equiangularly with respect to the first holes.

11. A nozzle as claimed in claim 10, wherein a diameter of the inner tube is 5–20 mm, a diameter of the outer tube is 20–60 mm, a diameter of the outlet is 5–20 mm, a diameter of the first holes is 2–6 mm, and a diameter of the second holes is 5–10 mm.

12. A nozzle as claimed in claim 8, wherein a diameter of the inner tube is 5–20 mm, a diameter of the outer tube is 20–60 mm, a diameter of the outlet is 5–20 mm, a diameter of the first holes is 2–6 mm, and a diameter of the second holes is 5–10 mm.

13. A nozzle as claimed in claim 8, wherein a diameter of the inner tube is 5–20 mm, a diameter of the outer tube is 20–60 mm, a diameter of the outlet is 5–20 mm, a diameter of the first holes is 2–6 mm, and a diameter of the second holes is 5–10 mm.

14. A nozzle as claimed in claim 8, wherein the second holes are arranged equiangularly with respect to the first holes.

15. A nozzle as claimed in claim 14, wherein a diameter of the inner tube is 5–20 mm, a diameter of the outer tube is 20–60 mm, a diameter of the outlet is 5–20 mm, a diameter of the first holes is 2–6 mm, and a diameter of the second holes is 5–10 min.

16. A nozzle as claimed in claim 1, wherein a diameter of the inner tube is 5–20 mm, a diameter of the outer tube is 20–60 mm, a diameter of the outlet is 5–20 mm, a diameter of the first holes is 2–6 mm, and a diameter of the second holes is 5–10 mm.

* * * * *